(12) United States Patent
Ogawa et al.

(10) Patent No.: US 8,429,667 B2
(45) Date of Patent: *Apr. 23, 2013

(54) STORAGE SYSTEM AND METHOD FOR CONTROLLING THE SAME

(75) Inventors: Junji Ogawa, Sagamihara (JP); Yusuke Nonaka, Sagamihara (JP); Yuko Matsui, Odawara (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/407,995

(22) Filed: Feb. 29, 2012

(65) Prior Publication Data

US 2012/0210329 A1 Aug. 16, 2012

Related U.S. Application Data

(63) Continuation of application No. 12/444,036, filed on Apr. 2, 2009, now Pat. No. 8,146,092.

(30) Foreign Application Priority Data

Oct. 10, 2008 (JP) ................................ 2008-263396

(51) Int. Cl.
*G06F 9/46* (2006.01)
*G06F 15/00* (2006.01)

(52) U.S. Cl.
USPC ................ 718/105; 718/104; 712/10; 712/22

(58) Field of Classification Search .................... None
See application file for complete search history.

(56) References Cited

U.S. PATENT DOCUMENTS

| | | | |
|---|---|---|---|
| 5,640,600 | A | 6/1997 | Satoh et al. |
| 6,594,698 | B1 | 7/2003 | Chow et al. |
| 7,523,286 | B2 | 4/2009 | Ramany et al. |
| 7,802,073 | B1 | 9/2010 | Cheng et al. |

(Continued)

FOREIGN PATENT DOCUMENTS

| | | |
|---|---|---|
| EP | 1 612 672 A1 | 1/2006 |
| EP | 1 936 487 A2 | 6/2008 |

(Continued)

OTHER PUBLICATIONS

U.S. Appl. No. 12/276,520, filed Nov. 24, 2008, Komika et al.
Japanese Office Action dated Jun. 26, 2012, Application No. 2011-502158.

*Primary Examiner* — Jennifer To
(74) *Attorney, Agent, or Firm* — Antonelli, Terry, Stout & Kraus, LLP.

(57) ABSTRACT

Optimum load distribution processing is selected and executed based on settings made by a user in consideration of load changes caused by load distribution in a plurality of asymmetric cores, by using: a controller having a plurality of cores, and configured to extract, for each LU, a pattern showing the relationship between a core having an LU ownership and a candidate core as an LU ownership change destination based on LU ownership management information; to measure, for each LU, the usage of a plurality of resources; to predicate, for each LU based on the measurement results, a change in the usage of the plurality of resources and overhead to be generated by transfer processing itself; to select, based on the respective prediction results, a pattern that matches the user's setting information; and to transfer the LU ownership to the core belonging to the selected pattern.

9 Claims, 17 Drawing Sheets

U.S. PATENT DOCUMENTS

| | | |
|---|---|---|
| 7,814,252 B2 | 10/2010 | Hoshaku |
| 8,250,556 B1 * | 8/2012 | Lee et al. .................. 717/159 |
| 2003/0220899 A1 | 11/2003 | Numanoi et al. |
| 2004/0210724 A1 | 10/2004 | Koning et al. |
| 2008/0126581 A1 | 5/2008 | Komikado et al. |
| 2008/0192047 A1 * | 8/2008 | Radzikowski et al. ....... 345/419 |
| 2009/0064158 A1 | 3/2009 | Carter |
| 2009/0150893 A1 | 6/2009 | Johnson et al. |
| 2010/0153687 A1 | 6/2010 | Koda et al. |

FOREIGN PATENT DOCUMENTS

| | | |
|---|---|---|
| JP | 7-225737 | 8/1995 |
| JP | 2003-345632 | 12/2003 |
| JP | 2008-134775 | 6/2008 |
| WO | WO 00/39679 | 7/2000 |

* cited by examiner

FIG.4

CONFIGURATION INFORMATION ~221

401 LU OWNERSHIP MANAGEMENT INFORMATION T401

| LU NUMBER | CONTROLLER NUMBER | CORE NUMBER |
|---|---|---|
| LU0 | 0 | 0 |
| LU1 | 1 | 0 |
| LU2 | 0 | 1 |
| ⋮ | | |

402 BALANCING PARAMETER INFORMATION T402

| ITEM | | | NUMERIC VALUE |
|---|---|---|---|
| LOAD BALANCE PRIORITY | | | 80 |
| STORAGE SYSTEM PERFORMANCE PRIORITY | | | 30 |
| ACCEPTABLE TRANSFER OVERHEAD LEVEL | | | 5 |
| PERFORMANCE INFORMATION REFERENCE RANGE | | | 10 MINUTES |
| ASSIGNMENT PRIORITY | | | 40 |
| | LU0 | – | 0 |
| | LU1 | 1-0 | 50 |
| | ⋮ | | |

403 DATA STORAGE INFORMATION T403

| LU NUMBER | SIZE | STRIPE SIZE | DRIVE POSITION | OFFSET |
|---|---|---|---|---|
| LU0 | 100GB | 1MB | 0~8 | 0GB |
| LU1 | 200GB | 256kB | 15~20 | 8GB |
| ⋮ | | | | |

FIG. 6

RESOURCE USAGE MANAGEMENT INFORMATION 501

T601

| LOCATION | CONTROLLER 0 | | | | ... | | CONTROLLER 1 | |
| --- | --- | --- | --- | --- | --- | --- | --- | --- |
| | CPU | | BUS 1 | BUS 2 | ... | DISK INPUT/OUTPUT CONTROL UNIT | INTER-CONTROLLER BUS | CPU |
| | CORE 0 | CORE 1 | | | | | | CORE 0 |
| ALL LUs | 80 | 60 | 40 | 20 | | 60 | 30 | 70 |
| LU0 | 10 | 2 | 5 | 0 | | 5 | 0 | 0 |
| LU1 | 5 | 0 | 5 | 0 | | 0 | 10 | 40 |
| LU2 | 0 | 50 | 20 | 5 | | 30 | 5 | 0 |
| LU3 | 0 | 0 | 5 | 0 | | 0 | 5 | 20 |
| ... | | | | | | | | |

FIG. 7

POST-CONTROL-RIGHT-TRANSFER RESOURCE USAGE CHANGE PREDICTION INFORMATION 502
T701

| LU | TRANSFER DESTINATION CORE (CONTROLLER NUMBER -CORE NUMBER) | CONTROLLER 0 | | | INTER-CONTROLLER BUS | CONTROLLER 1 | |
|---|---|---|---|---|---|---|---|
| | | CPU | | | | CPU | |
| | | CORE 0 | CORE 1 | ... | | CORE 0 | ... |
| LU0 | 0-0 | 0 | 0 | | 0 | 0 | |
| | 0-1 | -8 | +6 | | 0 | 0 | |
| | ... | | | | | | |
| | 1-0 | -7 | 0 | | +5 | +10 | |
| ... | ... | | | | | | |

LU OWNERSHIP CHANGE PROCESSING OVERHEAD PREDICTION INFORMATION

T801

| LU | TRANSFER DESTINATION CORE (CONTROLLER NUMBER -CORE NUMBER) | CONTROLLER 0 | | INTER-CONTROLLER BUS | CONTROLLER 1 | |
|---|---|---|---|---|---|---|
| | | CPU | ... | | CPU | ... |
| | | CORE 0 | | | CORE 0 | |
| LU0 | 0-0 | 0 | | 0 | 0 | |
| | 0-1 | +5 | | 0 | 0 | |
| | ... | | | | | |
| | 1-0 | +10 | | +5 | +20 | |
| ... | ... | | | | | |

FIG.12

MANAGEMENT SCREEN — 1201

AUTOMATIC TRANSFER SETTINGS — 1202

T1212

| ITEM | SET VALUE |
|---|---|
| AUTOMATIC TRANSFER | EXECUTE |
| PERFORMANCE BALANCE | MEDIUM PRIORITY |
| TOTAL PERFORMANCE | LOW PRIORITY |
| CONSIDERATION OF INFLUENCE BY TRANSFER OVERHEAD | HIGH PRIORITY |
| PERFORMANCE INFORMATION REFERENCE RANGE | 30 MINUTES |
| ⋮ | |

LU-BASED AUTOMATIC TRANSFER SETTINGS — 1203

T1213

| LU | CURRENT STATUS | | SETTINGS | | AUTOMATIC TRANSFER |
| | CONTROLLER NUMBER | CORE NUMBER | CONTROLLER NUMBER | CORE NUMBER | |
|---|---|---|---|---|---|
| LU0 | 0 | 0 | 0 | 0 | EXECUTE |
| LU1 | 1 | 0 | 1 | 0 | NOT EXECUTE |
| LU0 | 0 | 1 | 0 | 1 | LOW PRIORITY |
| ⋮ | | | | | |

1204 OK   1205 Cancel

FIG. 13

RESOURCE USAGE MANAGEMENT INFORMATION 1301

T1311

| LOCATION | CONTROLLER 0 | | | | | | | — | CONTROLLER 1 | |
| | CPU | | ... | CACHE | BUS 1 | BUS 2 | ... | DISK INPUT/OUTPUT CONTROL UNIT | ... | INTER-CONTROLLER BUS | CPU | ... |
| | CORE 0 | CORE 1 | | DIRTY DATA | | | | | | | CORE 0 | |
| ALL LUs | 80 | 60 | | 45 | 40 | 20 | | 60 | | 30 | 70 | |
| LU0 | 10 | 2 | | 10 | 5 | 0 | | 5 | | 0 | 0 | |
| LU1 | 5 | 0 | | 0 | 5 | 0 | | 0 | | 10 | 40 | |
| LU2 | 0 | 50 | | 20 | 20 | 5 | | 30 | | 5 | 0 | |
| LU3 | 0 | 0 | | 5 | 5 | 0 | | 0 | | 5 | 20 | |
| ... | | | | | | | | | | | | |

FIG.15

MANAGEMENT SCREEN — 1501

RESOURCE USAGE — 1511

T1512

| LOCATION | CONTROLLER 0 | | | | | | - | CONTROLLER 1 | |
|---|---|---|---|---|---|---|---|---|---|
| | CPU | | | CACHE | | BUS 1 | DISK INPUT/ OUTPUT CONTROL UNIT | INTER- CONTROLLER BUS | CPU | |
| | CORE 0 | CORE 1 | ... | DIRTY DATA | ... | ... | ... | | CORE 0 | ... |
| ALL LUs | 80 | 60 | | 45 | | 40 | 60 | 30 | 70 | |
| LU0 | 10 | 2 | | 10 | | 5 | 5 | 0 | 0 | |
| LU1 | 5 | 0 | | 0 | | 5 | 0 | 10 | 40 | |
| LU2 | 0 | 50 | | 20 | | 20 | 30 | 5 | 0 | |
| LU3 | 0 | 0 | | 5 | | 5 | 0 | 5 | 20 | |
| ⋮ | | | | | | | | | | |

RESOURCE USAGE CHANGE PREDICTION — 1521

T1522

| LU | TRANSFER DESTINATION CORE (CONTROLLER NUMBER- CORE NUMBER) | CONTROLLER 0 | | | INTER- CONTROLLER BUS | CONTROLLER 1 | |
|---|---|---|---|---|---|---|---|
| | | CPU | | ... | | CPU | ... |
| | | CORE 0 | CORE 1 | ... | | CORE 0 | ... |
| LU0 | 0-0 | 0 | 0 | | 0 | 0 | |
| | 0-1 | -8 | +6 | | 0 | 0 | |
| | ⋮ | | | | | | |
| ⋮ | | | | | | | |

LU OWNERSHIP CHANGE PROCESSING OVERHEAD PREDICTION — 1531

T1532

| LU | TRANSFER DESTINATION CORE (CONTROLLER NUMBER- CORE NUMBER) | CONTROLLER 0 | | INTER- CONTROLLER BUS | CONTROLLER 1 | |
|---|---|---|---|---|---|---|
| | | CPU | ... | | CPU | ... |
| | | CORE 0 | ... | | CORE 0 | ... |
| LU0 | 0-0 | 0 | | 0 | 0 | |
| | 0-1 | +5 | | 0 | 0 | |
| | ⋮ | | | | | |

[ OK ] — 1541   [ UPDATE ] — 1542

FIG.16

MANAGEMENT SCREEN ~1601

LU OWNERSHIP CHANGE PROCESSING EXECUTION HISTORY ~1611

T1612

| TIME | LU | BEFORE TRANSFER | | AFTER TRANSFER | |
|---|---|---|---|---|---|
| | | CONTROLLER NUMBER | CORE NUMBER | CONTROLLER NUMBER | CORE NUMBER |
| 2008/1/2 12:34:56 | LU0 | 0 | 0 | 0 | 1 |
| 2008/1/2 13:41:12 | LU5 | 1 | 0 | 1 | 1 |
| 2008/1/6 8:23:45 | LU0 | 0 | 1 | 1 | 0 |
| ⋮ | | | | | |

OK ~1621  UPDATE ~1622

STORAGE SYSTEM AND METHOD FOR CONTROLLING THE SAME

CROSS REFERENCE TO RELATED APPLICATION

This application is a continuation application of application Ser. No. 12/444,036, filed Apr. 2, 2009 now U.S. Pat. No. 8,146,092, the disclosure of which is hereby incorporated by reference.

TECHNICAL FIELD

The present invention relates generally to a storage system. More particularly, this invention relates to a technique for improving the performance of a storage system constituted from a plurality of resources including microprocessors.

BACKGROUND ART

A storage system is constituted from: a storage control unit for executing processing of data issued by a host computer; and storage devices for storing data. A technique for improving the reliability of the storage system by providing a plurality of storage control units described above and realizing data redundancy in storage devices is known (Japanese Patent Application Laid-Open (Kokai) Publication No. 2008-134775).

Japanese Patent Application Laid-Open (Kokai) Publication No. 2008-134775 discloses a storage system having a plurality of storage control units, wherein load is distributed by using a technique for delivering an input/output request issued by a host computer to a processor that should process the input/output request, thereby improving a data processing speed.

RELATED ART DOCUMENT

[Patent Document 1] Japanese Patent Application Laid-Open (Kokai) Publication No. 2008-134775

DISCLOSURE OF THE INVENTION

The above-mentioned publication discloses a system having a plurality of cores in a storage control unit. In this case, different resources are used for data processing between the cores in the same storage control units and between the cores in different storage control units. Therefore, as a result of load distribution, the processor cores may be uniformly loaded, but other resources may be ununiformly loaded.

Furthermore, overhead is generated when logical units which the processor core takes charge of are switched for the purpose of load distribution. Therefore, switching the logical units only for the purpose of load distribution may possibly degrade the performance of the storage system.

It is an object of the present invention to provide: a storage system capable of selecting and executing optimum load distribution processing based on the user's settings in consideration of load changes caused by load distribution in a plurality of asymmetric cores; and a method for controlling such a storage system.

In order to achieve the above-described object according to an aspect of the present invention, a plurality of asymmetric cores are provided as cores that receive an LU ownership in processing objects and thereby take charge of processing of the processing objects; and when distributing the load on the respective cores, patterns showing the relationship between a core having the LU ownership and a candidate core as a destination of transfer of the LU ownership are extracted for each processing object; the usage of the respective resources constituting the storage system is acquired; the state changes that may occur in association with the load distribution in each core are predicted based on the acquired usage of the respective resources; a pattern that matches the set conditions is selected based on the prediction results; and the LU ownership change destination is decided in accordance with the selected pattern.

EFFECT OF THE INVENTION

According to the present invention, optimum load distribution in a plurality of asymmetric cores can be performed in accordance with settings.

BRIEF DESCRIPTION OF THE DRAWINGS

FIG. 4 is a configuration diagram illustrating configuration information of the storage system according to the embodiment of the present invention.

FIG. 6 is a configuration diagram illustrating resource usage management information of the storage system according to the embodiment of the present invention.

FIG. 7 is a configuration diagram illustrating information about prediction results of changes in the resource usage after transfer of the LU ownership in the storage system according to the embodiment of the present invention.

FIG. 8 is a configuration diagram illustrating information about prediction results of overhead to be generated by LU ownership change processing itself executed by the storage system according to the embodiment of the present invention.

FIG. 12 is a management screen configuration diagram for explaining how a user of the storage system makes settings according to the embodiment of the present invention.

FIG. 13 is another form of management information configuration diagram showing the resource usage of the storage system according to the embodiment of the present invention.

FIG. 15 is a configuration diagram of a performance information display screen for the user of the storage system according to the embodiment of the present invention.

FIG. 16 is a configuration diagram of an LU ownership change processing history display screen for the user of the storage system according to the embodiment of the present invention.

BEST MODE FOR CARRYING OUT THE INVENTION

Figure 1:
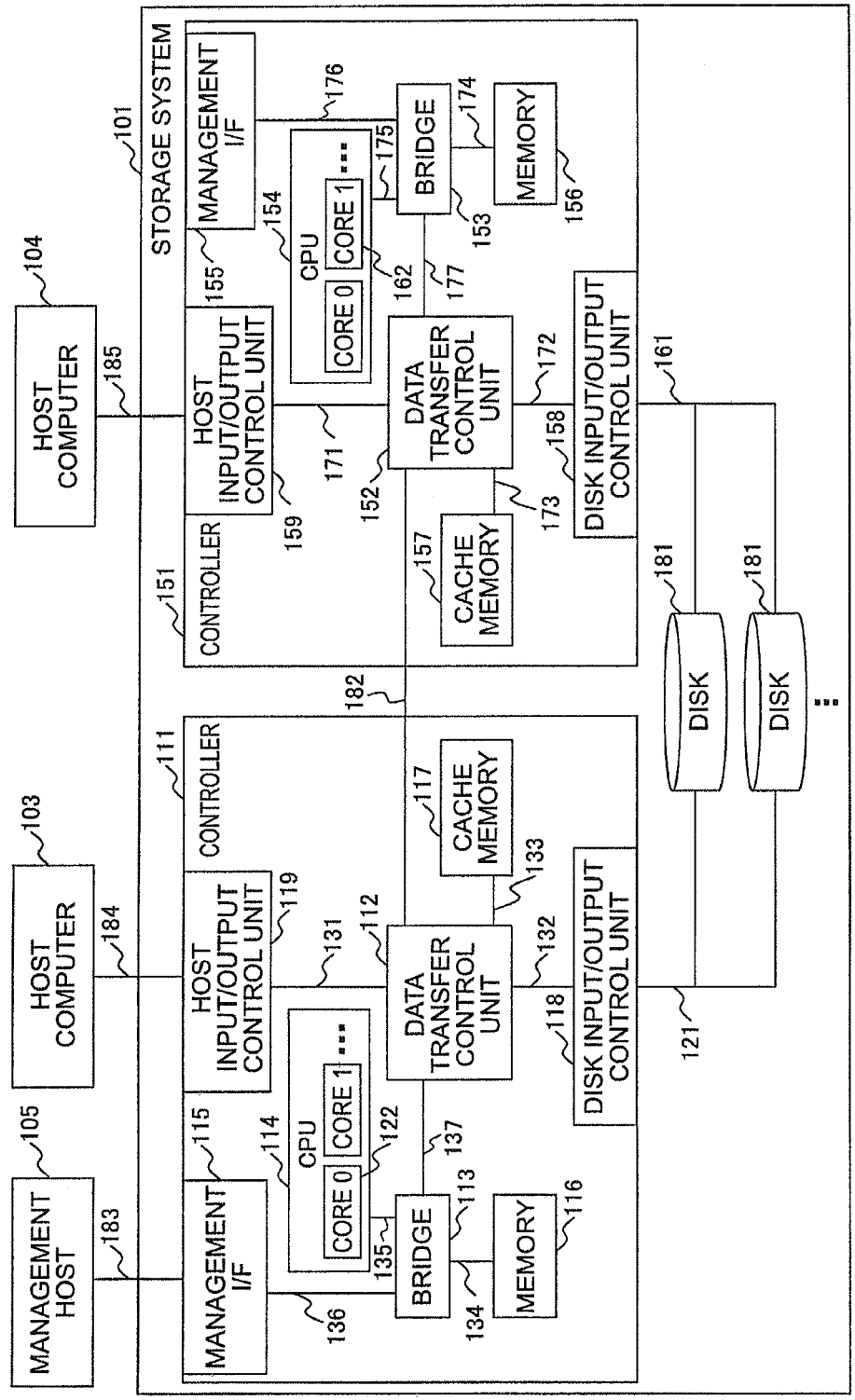
FIG. 1 is a block diagram of a storage system according to an embodiment of the present invention.

An embodiment of the present invention will be explained below with reference to the attached embodiment. FIG. 1 is a configuration diagram of a storage system according to an embodiment of the present invention. Referring to FIG. 1, the storage system includes a storage system 101, host computers 103, 104, and management host 105.

Each host computer 103, 104 has a communication port (not shown) for connection to the storage system 101, and is thereby connected via this communication port and a connection path 184, 185 to the storage system 101. The management host 105 is connected to the storage system 101 via a management connection path 183. The management host 105 is configured as an input unit for a user to input setting information such as setting information as a policy of load distribution.

FIG. 1 shows a configuration in which the host computers 103, 104, the management host 105, and the storage system 101 are directly connected to each other. A network called "SAN (Storage Area Network)" may be used for connection to the host, and a network called "LAN (Local Area Network)" may be used for connection to the management host, and a configuration that enables connection to many host computers and management hosts may be used. Protocols such as Fibre Channel and iSCSI (Small Computer System Interface over Internet) can be used as the SAN. Furthermore, the same connection path as that for connection to the host can be used for connection to the management host.

The storage system 101 contains a controller 111, a controller 151, and disks 181. The controllers 111, 151 are given numbers "0" and "1" respectively, as "controller numbers." The controllers 111 and 151 are connected via an inter-controller bus 182. The controllers 111, 151 and the disks 181 are connected via disk connection paths 121, 161.

Referring to FIG. 1, the disks 181 are used as general storage devices. For example, HDDs (Hard Disk Drives) for FC (Fibre Channel), SAS (SAN Attached Storage), ATA (AT Attachment), or SSD (Solid State Drive) may be used as the disks 181. Moreover, storage media, other than disks 181, such as tapes or flash memories may be used. Furthermore, a RAID (Redundant Array of Inexpensive Disks) may be configured using a single disk 181 and a plurality of disks 181, and the disks 181 having the RAID configuration can be access objects of the host computers 103, 104.

The controller 111 includes a host input/output controller unit 119, a data transfer control unit 112, a disk input/output controller unit 118, a cache memory 117, a management I/F 115, a CPU (Central Processing Unit) 114, a bridge 113, and a memory 116.

The management I/F 115 is connected via an internal bus 136 to the bridge. The management I/F 115 is also connected via the management connection path 183 to the management host 105 and controls data transmission/reception to/from the management host 105 and communications with the management host 105.

The memory 116 is connected via an internal bus 134 to the bridge 113. The CPU 114 is connected via an internal bus 135 to the bridge 113 and stores a plurality of cores 122.

FIG. 1 shows the CPU 114 as a single component, but the storage system may be provided with a plurality of CPUs 114. Regarding how to use the plurality of cores or processors, there are a symmetric processing method called "SMP (Symmetric Multi Processing)" and an asymmetric processing method called "AMP (Asymmetric Multi Processing)."

By the SMP method, an OS (Operating System) generally decides which core or processor should execute which processing. In this case, the effect of load distribution varies greatly depending on which core or processor actually executes the processing. Therefore, control programs including the OS are required to be capable of selecting the core or processor for executing the processing.

By the AMP method, the control programs can expressly designate the core or processor for executing the processing. In the case of the SMP method, the OS has the function capable of selecting the core or processor for executing the processing; and, therefore, this function is utilized. Incidentally, in the case of the AMP method, there is an implementation method in which each core processor takes charge of specific processing and all the processing cannot be executed by only one core processor.

If the setting is made so that only the $0^{th}$ core can control the host input/output control unit 119, processing for input/output to/from the storage system 101 cannot be executed without using this core.

Unless specifically noted, the term "core" used hereinafter means a processing system capable of processing all inputs/outputs to/from the storage system 101. In other words, the core 122 executes various arithmetic processing in accordance with programs stored in the memory 116 and controls the entire controller 111 based on the processing results.

The data transfer control unit 112 is connected via an internal bus 137 to the bridge 113. The data control unit 112 controls data transfer in the controller 111. Also, the data transfer control unit 112 and the data transfer control unit 152 are connected to each other via the inter-controller bus 182. As a result, the controllers 111, 151 can communicate with each other via the inter-controller bus 182.

The cache memory 117 is connected via an internal bus 133 to the data transfer control unit 112 and temporarily stores data to be transferred when transferring the data.

The host input/output control unit 119 is connected via the connection path 184 to the host computer 103 and controls input/output from/to the host computer 103.

The disk input/output control unit 118 is connected via the disk connection path 121 to the disks 181 and controls data input/output from and to the disks.

The controller 151, like the controller 111, includes a host input/output control unit 159, a data transfer control unit 152, a disk input/output control unit 158, a cache memory 157, a management I/F 155, a CPU 154, a bridge 153, and a memory 156; and the CPU 154 is constituted from a plurality of cores 162.

The respective components shown in this embodiment are not necessarily essential. For example, there is a configuration where a chip in which the CPU 114 and the bridge 113 are integrated may be used, or a chip in which the CPU 114, the bridge 113, and the data transfer control unit 112 are integrated may be used. Furthermore, there are a configuration where the cache memory 117 and the memory 116 are realized by the same memory, and a configuration constituted from a plurality of processors described above.

If the components are changed as described above, the content of resource usage management information 501 described later will change according to the configuration. If the configuration is changed so that the memory 116 includes the cache memory 117, the bus 133 for connecting the cache memory 117 and the data transfer control unit 112 does not exist and, instead, data corresponding to the data to be supplied between the cache memory 117 and the data transfer control unit 112 will be supplied to the internal bus 134.

Also, there is a configuration that uses physically different memories between processors in a multiprocessor environment. In this case, it is necessary to measure and evaluate the resource usage of the memories and the memory busses individually. As a matter of course, it is possible to realize the configuration similar to that described above, even in a multi-core configuration. In this case, the above-mentioned individual evaluation is required.

Figure 2:
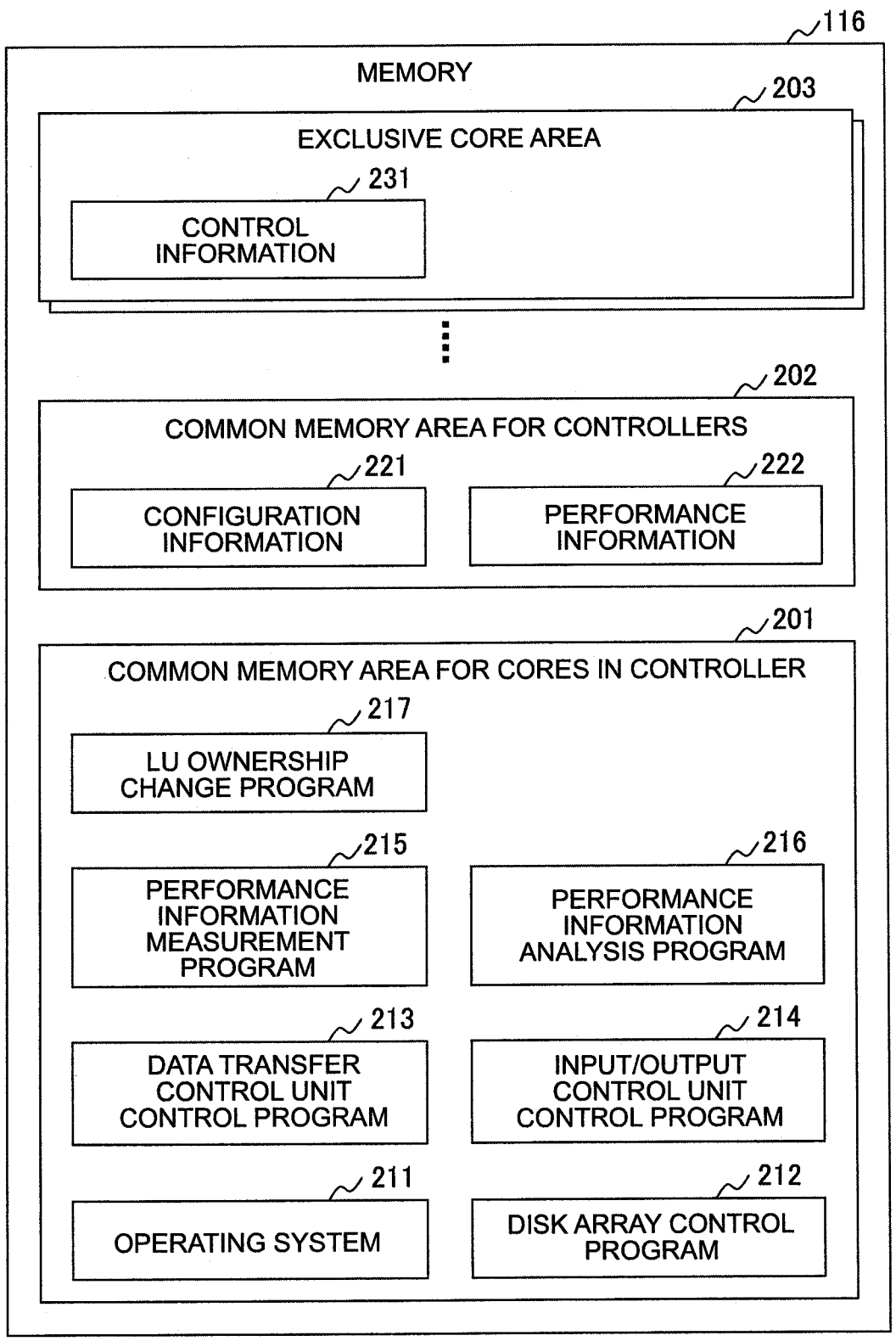
FIG. 2 is a memory configuration diagram of the storage system according to the embodiment of the present invention.

The memory 116, as shown in FIG. 2, stores a common memory area for cores in a controller 201, a common memory area for controllers 202, and an exclusive core area 203. Information stored in each of these areas will be described below. However, all these pieces of information are not always required to be stored in the areas shown in FIG. 2.

If control information 231 is stored in the common area for cores in a controller 201, the used memory size will be reduced. On the other hand, if the control information 231 is stored in the exclusive core area 203, the memory size will increase due to redundancy of the control information 231 and an increase of useless areas, but storing the control information 231 in the exclusive core area 203 has the effect of improving the performance by, for example, elimination of the necessity to execute exclusive processing when accessing inter-core information.

The exclusive core area 203 stores the control information 231. The control information 231 is information needed when the cores 122 for the CPU 114 process I/O issued to the storage system 111. The control information 231 includes, for example, memory information managed by the cores 122 as well as information tables to which the host input/output control unit 119 and the disk input/output control unit 118 refer. The exclusive core area 203 basically stores only the information necessary for the areas which the cores 122, 162 are in charge of.

As the areas which the cores 122, 162 are in charge of, LU (Logical Units) that are processing objects of the cores 122, 162 are hereinafter considered to be units which the cores 122, 162 are in charge of. A logical unit LU is a virtual logical area configured in physical storage areas of the disks 181. As a matter of course, a range different from that of the LU can be the range which the cores 122, 162 are in charge of.

The common memory area for controllers 202 stores configuration information 221 and performance information 222.

The common area for cores in a controller 201 stores an operating system 211, a disk array control program 212, a data transfer control unit control program 213, an input/output control unit control program 214, a performance information measurement program 215, a performance information analysis program 218, and an LU ownership change program 217. Each program is executed by each core 122, 162. The following explanation is given on that condition.

The LU ownership change program 217 is a program that performs operation on LUs, which each core is in charge of, to transfer the LU ownership in one core to another core. The performance information measurement program 215 is a program for monitoring the usage of various resources in the storage system 101, measuring to what degree each resource is being used, and storing the measurement results in the performance information 222. The performance information analysis program 216 is a program for analyzing the performance information 222 measured by the performance information measurement program 215 and controlling the execution of LU ownership change processing.

The data transfer control unit control program 213 is a program for controlling the data transfer control unit 112, and the input/output control unit control program 214 is a program for controlling the host input/output control unit 119 and the disk input/output control unit 118. The operating system 211 is a program used for the operation of the cores for the CPU 114, and the disk array control program 212 is a program used for controlling the entire disk array by performing, for example, calculation of the address of input/output to/from the disks 181.

The memory 156 has a configuration similar to that of the memory 116. The LU ownership change program 217 is a program for changing the core in charge of processing of an input/output request received from the host computer 103, 104, but not limiting a physical port to receive an input/output request. In other words, processing of an input/output request received from the host computer 103, 104 prior to the LU ownership change processing will not be disabled by the LU ownership change processing, and the transfer processing can be executed without stopping the input/output request.

Figure 3:
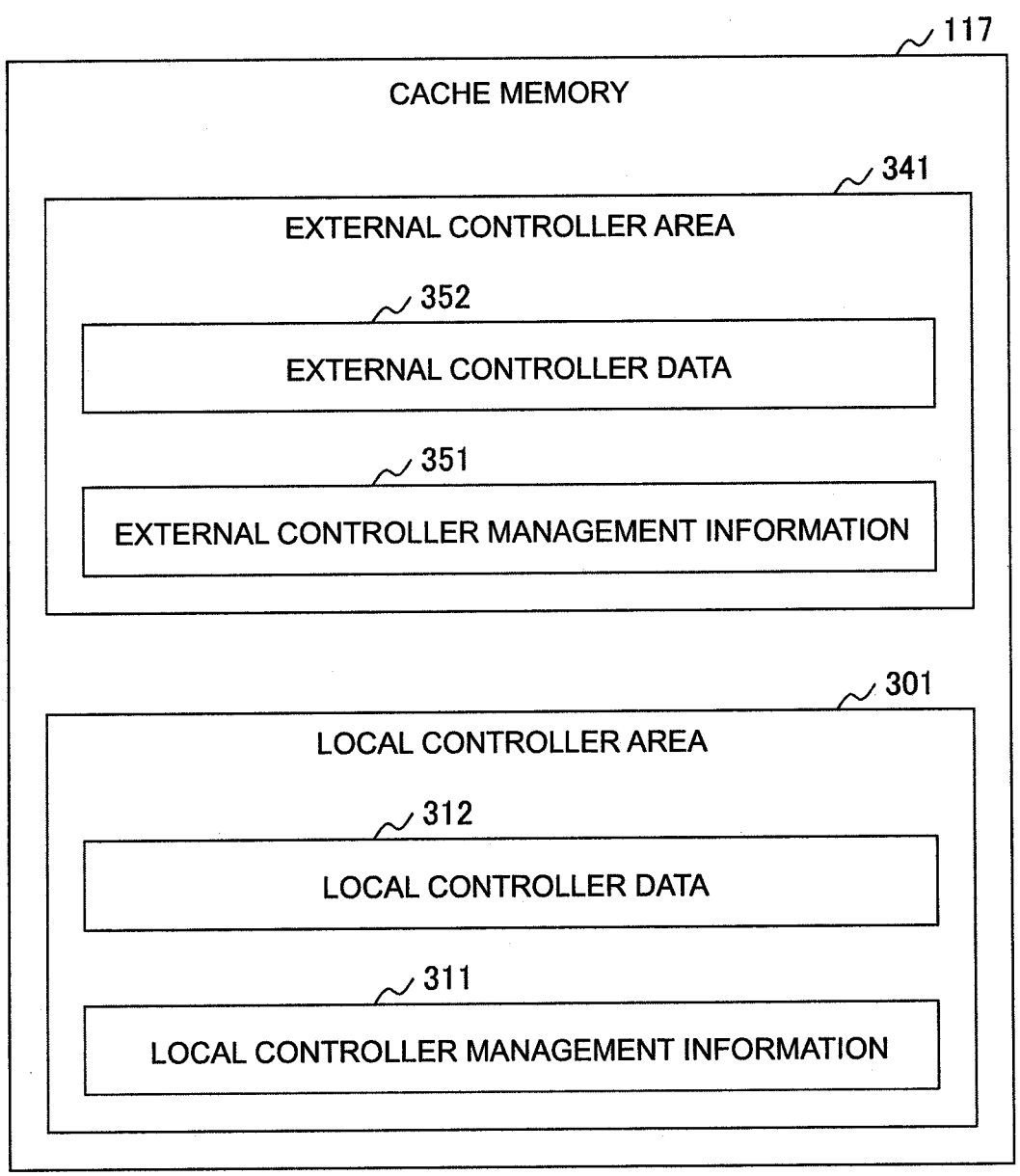
FIG. 3 is a cache memory configuration diagram of the storage system according to the embodiment of the present invention.

The cache memory 117, as shown in FIG. 3, stores a local controller area 301 and an external controller area 341. The local controller area 301 means an area used by the cores for the controller in which the relevant cache memory exists. For example, in the cache memory 117 in the controller 111 with controller number "0," the local controller area 301 is an area used by the cores 122 for the controller 111.

The external controller area 341 means an area used by the cores for controllers other than the controller in which the relevant cache memory exists. For example, in the cache memory 117, the external controller area 341 is an area used by the cores 157 for the controller 151. In the cache memory 157 for the controller 151, the local controller area and the external controller area are opposite to those for the cache memory 117 for the controller 111.

The local controller area 301 stores local controller management information 311 and local controller data 312. The local controller management information 311 is management information used by the cores for the controller 111, such as the storage status of the local controller data 312. The external controller area 341 stores external controller management information 351 and external controller data 352.

In this way, fault tolerance is improved also for data used by the external controller by storing it in the cache memory 117.

From among the above-mentioned pieces of information, the controller management information 311, 351 is mirror-written by the cores 122, 162, and the controller data 312, 352 is mirror-written mainly by the data transfer control units 112, 152. As a result, the cache memories 117, 157 store both the controller management information 311, 351 and the controller data 312, 352.

As a matter of course, there is some information that is only required to be stored in the local controller in order to reduce the load. Therefore, the above-mentioned pieces of information are not necessarily completely dualized. If the cache memory 117 is used as a temporary area for operation, it is only necessary to temporarily store data only in the local controller area 301, and the local controller area 301 may not necessarily completely correspond to the external controller area in the cache memory 157.

The configuration information 221, as shown in FIG. 4, is constituted from LU ownership management information 401, balancing parameter information 402, and data storage information 403.

The LU ownership management information 401 stores an LU ownership management table T401 that manages a correspondence relationship indicating which core is in charge of I/O to/from each area. Since the LU is the management area unit in this embodiment, FIG. 4 shows the management of which core is currently in charge of processing with regard to each LU.

The balancing parameter information 402 stores a balancing parameter table T402. The balancing parameter table T402 includes default parameters or parameters set by the user as parameters used when executing load balancing, and provides guidelines for determining the details of processing when controlling the load balance. To what degree the load balancing should be performed is decided based on a numeric value set as a load balance priority and a numeric value set as a storage system performance priority.

If the load balance priority is high and the storage system performance priority is low, the load balance is controlled so that the load on the respective resources will be distributed and balanced, even though the system performance might slightly degrade. Conversely, if the load balance priority is low and the storage performance priority is high, the load balance is controlled so that the total performance will be enhanced, even though the load may be slightly imbalanced.

An acceptable transfer overhead level is a parameter indicating to what degree the overhead generated by operation of the aforementioned LU ownership change program 217 and execution of the LU ownership change processing is acceptable. If this numeric value is low, i.e., if the acceptable level is low, only transfer with small overhead is permitted. This means that transfer with a small amount of information to take over as a result of the transfer is permitted, for example, in a case where I/O has been stopped for a certain period of time prior to the transfer and no or only little data exists in the cache memory 117, 157.

A performance information reference range is the range of performance information to which reference is made when transferring the LU ownership. If a short period of time is set to this parameter, load changes in the short period of time can be followed, but the possibility of executing the LU ownership change which is essentially unnecessary or harmful in terms of performance may increase due to a temporary or sudden load change. Conversely, if a long period of time is set to this parameter, the probability of failure in transferring the LU ownership will decrease, but the possibility of not transferring the LU ownership or delaying the transfer time will increase in the situation where the LU ownership change should be executed.

An assignment priority is set when the user expressly indicates the LU ownership and does not intend to transfer the LU ownership. In other words, the assignment priority is used for the purpose of, for example, performance assurance in a case where the LU ownership in a certain LU is set to a specific core and no transfer of the LU ownership from this core is permitted, and transfer of an LU ownership in another LU to the core specified above is not permitted.

The data storage information 403 is constituted from a data storage information table T403. The data storage information table T403 is information indicating where to store data issued to the LUs managed by the storage system 101, and stores information necessary for data storage processing.

Figure 5:
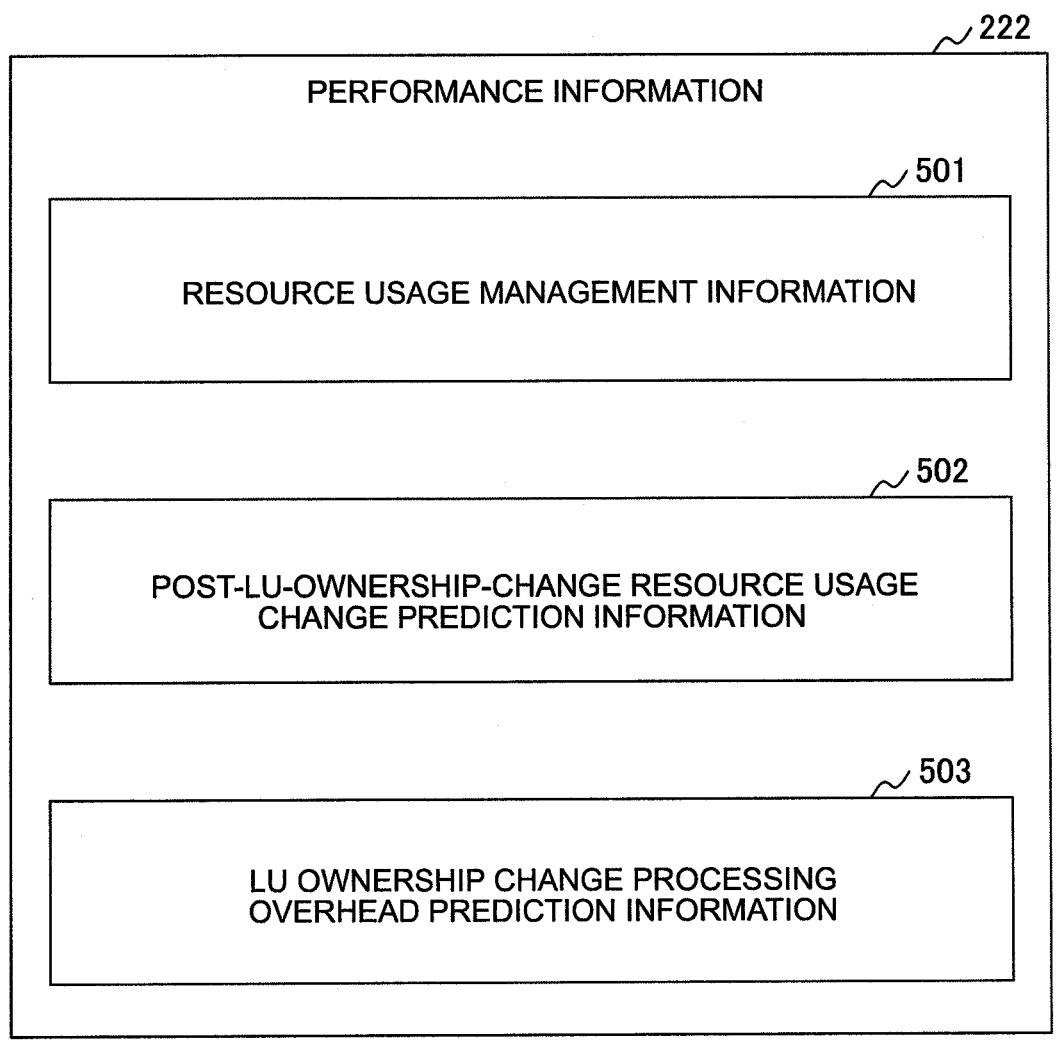
FIG. 5 is a configuration diagram illustrating performance information of the storage system according to the embodiment of the present invention.

The performance information 222 stores, as shown in FIG. 5, resource usage management information 501, post-LU-ownership-change resource usage change prediction information 502, and LU ownership change processing overhead prediction information 503.

The resource usage management information 501 stores a resource usage management information table T601 as shown in FIG. 6. The resource usage management information table T601 stores the usage of each resource as measured for each LU, which is the LU ownership management unit, by the performance information measurement program 215, together with the past history. Whether or not the load is imbalanced in the current storage system 101 can be judged based on the resource usage management information table T601. Also, information about whether the load remains imbalanced or not and what degree of change has occurred can be acquired based on the past history.

Incidentally, as shown in the resource usage management information table T601, the load with regard to a certain LU is not necessarily imposed on the core in charge of that LU and the controller thereof. This is because the inter-controller bus 182 and the buses 133, 173 for connecting the cache memories 117, 157 and the data transfer control units 11, 152 are used to utilize these resources, for example, when data is stored in the cache memory for the external controller by mirror-writing of the data.

Furthermore, the resource usage management information 501 shows all the usage of the resources as measured by the performance information measurement program 215 in relation to the performance of the storage system 101 and contains many pieces of information other than the above-described items.

Particularly, the usage of the cache memories 117 and 157 stored in resource usage management information 1301 and a resource usage management information table T1301 shown in FIG. 13 have a significant influence on the performance in the LU ownership change processing. Dirty data from among data existing in the cache memory 117 represents data that has not been reflected in the disks 181; and if there is a large amount of dirty data, it means that many processing sequences are left uncompleted for the relevant LU. Therefore, there is a possibility that the LU having a large amount of dirty data may temporarily impose large load, in addition to I/O load at that time, on the processor to which the LU ownership has been transferred; and, as a result, it is possible to consider/predict the possibility of the temporary imposition of large load by referring to the dirty data recorded in this table T1301.

Besides the dirty data, the amount of data that is not mirror-written also has an influence on the performance in the LU ownership change processing. Generally, dirty data is often mirror-written to the cache memories 117 and 157 in preparation for failures such as electric power interruption.

On the other hand, non-dirty data and dirty data of low importance are sometimes not mirror-written for the purpose of reduction of the usage rate of the inter-controller bus 182 and the usage of the cache. Regarding the mirror-written data, the same data already exists in the cache memories 117 and 157 and, therefore, data migration is not particularly performed.

However, regarding the data which is not mirror-written, processing for discarding data in a source controller is required when the LU ownership is transferred between the different controllers, and if the relevant data is copied or migrated and is then to be discarded in order to utilize the relevant data. The cache memory 117 is shared by the cores in the controller in order to execute the above-described processing; and the above-described processing is not needed when transferring the LU ownership not between different controllers. Therefore, whether or not the LU ownership is transferred between different controllers produces a significant difference in the load. As a result, the type and amount of data in the cache memory are important factors to decide what kind of LU ownership change to be performed.

The post-LU-ownership-change resource usage change prediction information 502 stores a post-LU-ownership-change resource usage change prediction information table T701 as shown in FIG. 7. The post-LU-ownership-change resource usage change prediction information table T701 is created by the performance information analysis program 216, and the post-LU-ownership-change resource usage change prediction information table T701 stores predicted information about what kind of changes in the load would occur for each resource after transfer of the LU ownership if the LU ownership in a certain LU is transferred to a certain core.

For example, FIG. 7 shows to what degree the load on each core would change if the LU ownership in LU0 is transferred to each different core. If the LU ownership currently belonging to core 0 for controller 0 (destination core "0-0" in FIG. 7) is transferred to core 0 for controller 1 (destination core "1-0" in FIG. 7), FIG. 7 shows that load on the core 0 for controller 0 which originally had the LU ownership becomes −7 and load on the core 0 for controller 1 that has taken over the LU ownership becomes +10.

As in the above-described case, there may be a case where the load on the entire system will be increased by transfer of the LU ownership. This is because if a host I/O is sent from the host input/output control unit 119 for the controller 111, the core for the controller 111 needs to receive the command once and then deliver the information to the core in charge of the command, and the processor resources for both cores are slightly consumed.

If the LU ownership is transferred to core 1 for controller 0 (destination core "0-1" in FIG. 7), the total amount of change is negative, which means the load on the entire system will decrease. The reason for this prediction is also a result of consideration of load caused by information communications between the cores. The above phenomenon occurs when the entire host input/output control unit 119 or the port that currently mainly receives commands is the host input/output control unit or port which the core 1 for controller 0 is in charge of and controls.

If a command is received by the host input/output control unit or port which the core 1 for controller 0 is in charge of as described above, information communications between the relevant cores in both states, i.e., in the pre-transfer state where the LU ownership belongs to the core 0 for controller 0, and in the post-transfer state where the LU ownership belongs to the core 0 for controller 1. However, the system load in the state where the core 0 for controller 0 has the LU ownership as described above is lower than in the state where the core 0 for controller 1 has the LU ownership, because different resources are required for the above-mentioned information communications. Exchanging information between the cores 0 and 1 for controller 0 is processing completed within the memory 116 shared by these cores.

On the other hand, if information is to be delivered from the core 1 for controller 0 to the core 0 for controller 1, the information needs to pass through the data transfer control unit 112, the inter-controller bus 182, and the data transfer control unit 152. Therefore, not only the cores, also the bus through which the information passes consume the resources during the processing.

In the case of writing data that may possibly take a long time, for example, writing data from the core 122 to the memory 156 for the external controller, it is common to select a method of reducing resource consumption by the cores by means of post-writing. However, in consideration of the case where a post-write buffer is already in use, this processing could consume more resources than the memory 116 for the local controller.

If exchanging data between the cores in the same controller is compared to exchanging data between the cores in different controllers as described above, the resource consumption can be reduced in the former case.

The post-LU-ownership-change resource usage change prediction information table T701 stores information in consideration of load changes that might occur due to the state changes as described above. Therefore, it is possible to comprehend changes in the system performance that might occur due to the transfer of the LU ownership.

The LU ownership change processing overhead prediction information 503 stores an LU ownership change processing overhead prediction information table T801 as shown in FIG. 8. The LU ownership change processing overhead prediction information table T801 predicts overhead to be generated by the transfer processing itself for transferring the LU ownership in a certain LU to a core in certain controller. The LU ownership change processing overhead prediction information table T801 is, unlike other performance information, information about load to be generated when executing the transfer processing. Therefore, the unit use in this table T801 is, for example, time required for processing.

Regarding the LU ownership change processing, the load, i.e., processing time varies depending on the amount of transferred data. If the LU ownership is transferred from the core 0 for controller 0 (destination core "0-0" in FIG. 8) to the core 0 for controller 1 (destination core "1-0" in FIG. 8), and if no data is stored in the cache memory 117, processing for passing the data to the transfer designation is unnecessary.

On the other hand, if data exists in the cache memory 117, the processing for passing the data to the transfer designation is necessary. In this situation, the management information and data exist in the local controller area 301. Regarding the management information and data, from among the management information and data described above, that belong only to the local cache memory, for example, original data existing in the disks 181, and that do not need to be dualized in the cache memory, it is necessary to execute processing for discarding such management information and data.

If the management information and data exist in the local cache memory and the external cache memory, the information existing in the local controller area 301 needs to be physically and logically migrated to the external controller area 341. Similarly on the controller 151 side, the management information and data existing in the external controller area in the cache memory 157 need to be physically and logically migrated to the local controller area.

Figure 9:
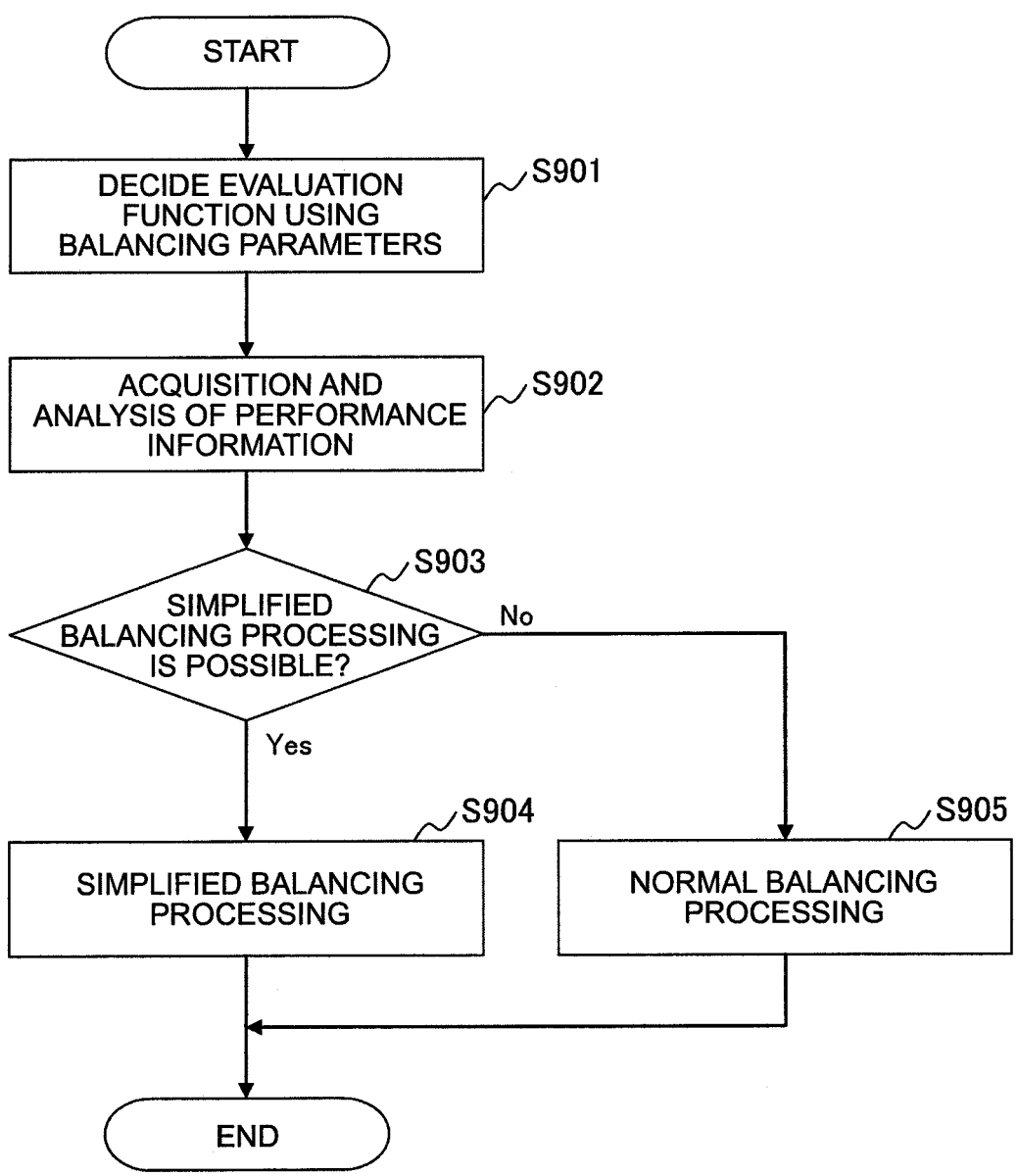
FIG. 9 is a flowchart illustrating balancing processing executed by the storage system according to the embodiment of the present invention.

Next, a processing sequence for load distribution processing will be explained with reference to the flowchart in FIG. 9. The following processing is executed by the core 122 or 162 according to the relevant programs. First, an evaluation function is decided using the information in the balancing parameter information table T402 in accordance with the performance information analysis program 216 (S901). As a result, which item should be prioritized is decided regarding, for example, the load balance and the system performance.

Next, the performance information 222 is obtained by the performance information measurement program 215, and this information is analyzed by the performance information analysis program 216 (S902). The performance information acquisition results are written to the resource usage management information table T601, and the performance information analysis results are written to the post-LU-ownership-change resource usage change prediction information table T701 and the LU ownership change processing overhead prediction information table T801.

Subsequently, whether simplified balancing processing is possible or not is judged (S903). The simplified balancing processing is relatively simple processing for deciding the details of the LU ownership change processing and for executing the transfer as described later. In this processing, processing for deciding the transfer source and the transfer destination is first performed. Therefore, as applicable conditions in this case, settings are made in the balancing parameter information table T402 so that the load balance is prioritized and the system performance is not prioritized so much.

If S903 returns an affirmative judgment (the simplified balancing processing is possible), the simplified balancing processing is executed (S904). If S903 returns a negative judgment, normal balancing processing is executed (S905).

Figure 14:
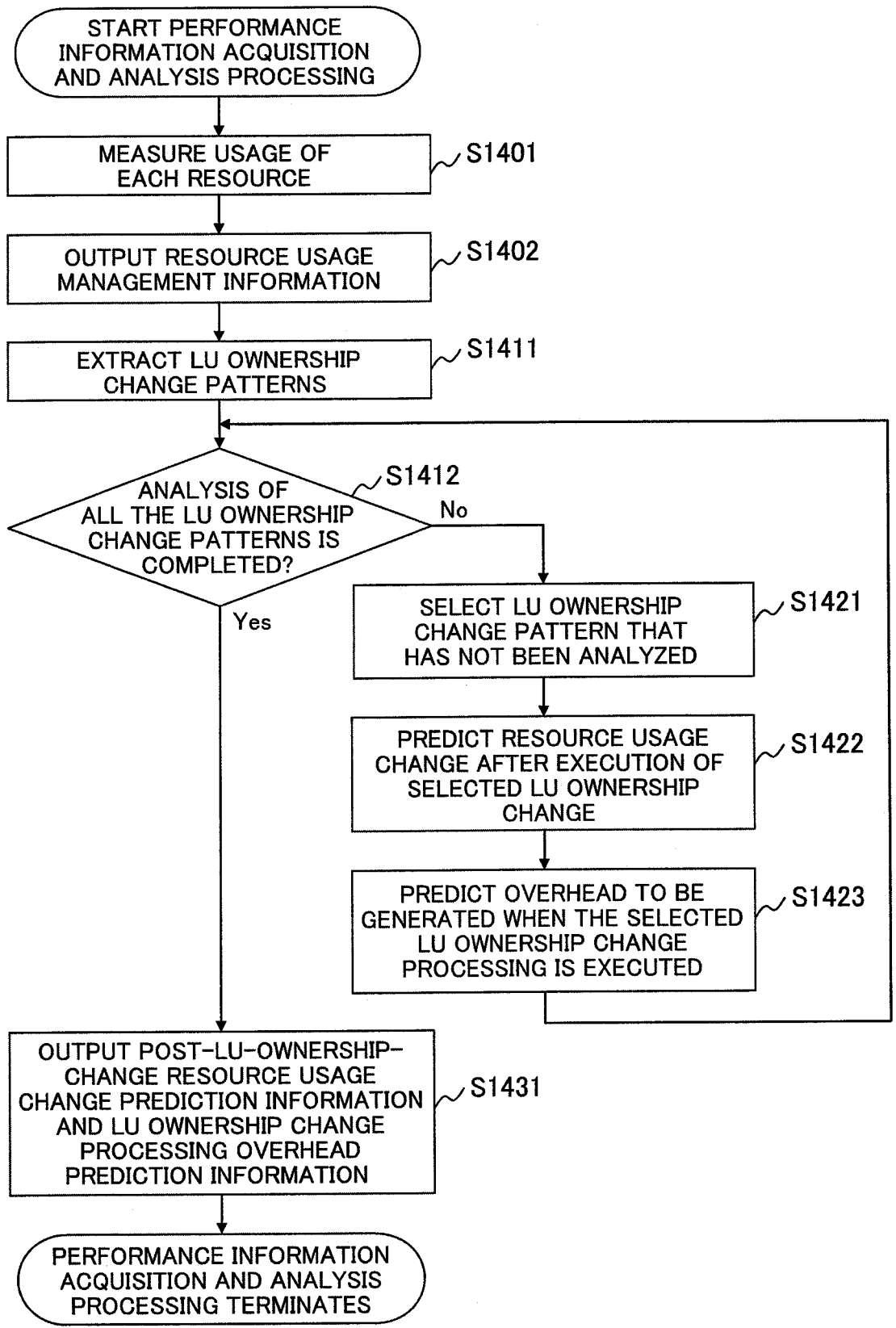
FIG. 14 is a flowchart illustrating performance information acquisition and analysis processing executed by the storage system according to the embodiment of the present invention.

Next, the performance information acquisition and analysis processing (S902) will be explained with reference to FIG. 14. The following processing is executed by the core 122 or 162 according to the relevant programs. First, the usage of each resource is measured by the performance information measurement program 215 (S1401). Since the performance information acquired in this step is used for judgment in the LU ownership change processing, not only a simple resource usage rate, but also further detailed information are required. For example, regarding the CPU usage rate of a certain core, the usage rate of each management unit, not the simple usage rate of the entire core, is measured. Since the management unit is an "LU" in this embodiment, the usage rate of each LU for each core is measured. The same applies to other resources.

Information used for judgment of the status after the LU ownership change is also necessary. In addition to the above-described information indicating which LU is used to what degree, information relating to the usage rate of the inter-controller bus 182 include: information indicating that the usage rate the inter-controller bus 182 has changed due to mirror-writing of write data from the host; information indicating that the usage rate of the inter-controller bus 182 has changed due to transfer of read data from the disk 181 to the other controller; or information indicating the usage rate of the former case and the usage rate of the latter case.

In the case of mirror-writing of write data, load changes will not occur before and after transfer of the LU ownership even if the LU ownership is transferred between the different controllers. However, in the case of, for example, read data transfer, whether it is necessary to use the inter-controller bus 182 or not changes depending on whether the disk input/output control unit 118 or 158 and the host input/output control unit 119 or 159 used when reading data from the disk 181 are in the same controller or not. The usage of the internal buses such as the bus 132 is also measured for each type of data transfer because of the same reason as described above.

Next, the measured resource usage is output to the resource usage management information table T601 (S1402). Although the resource usage management information table T601 stores only the representative information, the aforementioned information such as the usage rates of different types of data transfer is also output to the resource usage management information table T601.

Subsequently, LU ownership change patterns are extracted (S1411). In this step, all the possible LU ownership change patterns are extracted for each management unit. For example, as shown in the LU ownership management information table T401, the LU ownership in LU0 is assigned to the CPU core with the controller number "0" and the core number "0"; and in a system having two CPU cores for each controller, LU ownership change destination candidates for LU0 are (0-1), (1-0), and (1-1).

Incidentally, numbers in parentheses indicates "controller number—core number." The above-mentioned candidates may be further narrowed down depending on LU ownership change settings described later in detail. Furthermore, there may be a case where the LU ownership cannot be transferred due to occurrence of a failure in hardware or software; and also in this case, besides the settings made by an administrator, the aforementioned LU ownership change destination candidates will be narrowed down.

Subsequently, whether analysis of all the LU ownership change patterns is completed or not is judged (S1412). In this step, whether or not the analysis processing (S1422 and S1423) described later is completed for all the LU ownership change patterns extracted in S1411 is judged; and if S1412 returns an affirmative judgment (the analysis of all the LU ownership change patterns is completed), output processing (S1431) is executed; or if S1412 returns a negative judgment (the analysis of all the LU ownership change patterns is not completed), the LU ownership change pattern selection (S1421) is executed.

In the LU ownership pattern selection processing S1421, an LU ownership change pattern for which S1422 and S1423 have not been performed is searched for from among the LU ownership change patterns extracted in S1411, and such an LU ownership change pattern is selected as the object of the following processing.

Next, how the resource usage will change after the LU ownership change is predicted for the LU ownership change pattern selected in S1421 (S1422). In the following explanation, in a case where, for example, the LU ownership in LU0 assigned to the core 0 for controller 0 is transferred to the core 1 for controller 0 and to the core 0 for controller 1 respectively, how to predict changes that might occur due to the LU ownership change will be described with reference to the post-LU-ownership-change resource usage change prediction information table T701.

First, information about the resources that LU0 is currently using is output to the resource usage management information table T601 in S1411. An arbitrary unit can be used for the usage rate of each resource in the resource usage management information table T601 and, for example, "%" is used as the unit.

In this example shown in the resource usage management information table T601, LU0 uses 10% of the CPU core resource of the core 0 for controller 0 and 2% of the CPU core resource of the core 1 for controller 0. The reason why LU0 uses 2% of the CPU core resource of the core 1 for controller 0 in which LU0 does not have the LU ownership is because the configuration where the core 1 for controller 0 controls the disk input/output control unit 118 is assumed.

As a matter of course, if the above-described assumption is applied to a configuration where the core 0 for controller 0 and the core 1 for controller 0 can respectively freely use all the resources of the disk input/output control unit 118, communications between the cores and inter-core association processing will be enhanced.

However, if only a single core can be used in a function of the disk input/output control unit 118, or if the disk input/output control unit 118 has two or more independent resources and each core occupies and uses these resources in order to reduce overhead, for example, for the purpose of exclusive control, the configuration in which each core occupies part of the resources of the disk input/output control unit 118 as described above is also possible.

The usage rate of the inter-controller bus is 0%, that is, the inter-controller bus is not used. This means that data which needs to be mirror-written is not exchanged with regard to LU0.

As changes after the LU ownership in LU0 is transferred to the core 1 for controller 0, the resource usage change prediction information table T701 show "−8%" for the core 0 for controller 0 and "+6%" for the core 1 for controller 0. In other words, the post-transfer usage rate of the core 0 for controller 0 is 2%.

This is because when receiving an input/output request issued from the host computer 103 in this embodiment, the core 0 for controller 0 executes processing for analyzing the received request once and using the processor resources for this analysis processing is assumed. Needless to say, a configuration in which the physical port that received the request in the host input/output control unit 119 assigns the analysis to a core, and a configuration in which at the time of reception of the request, the received request analysis processing is assigned by the function of the host input/output control unit 119 to an appropriate core, that is, the core having the LU ownership or the core with a low resource usage rate at that time are also possible. Particularly in the latter configuration, there may be a case where the CPU usage rate of the core 0 for controller 0 becomes "0."

In this embodiment, a configuration in which part of the resources of the host input/output control unit 119 is occupied by the respective cores is assumed in the same manner as in the processing for assigning the core to the disk input/output control unit 118 as described above. Since the core 1 for controller 0 newly takes charge of the processing which has been executed by the core 0 for controller 0 which had the LU ownership before, the CPU usage rate of the core 1 for controller 0 increases, which results in 6%. When attention is focused on a total of the CPU usage rates, the total usage rate before the transfer is 12% and the total usage rate after the transfer is 10%, so that the total usage rates before and after the transfer are not the same.

This means that based on the above-described assumption that the core 1 for controller 0 uses the disk input/output control unit 118, processing for communications between the controller 0 core 0 and the core 1 for controller 0 that may occur when the core 0 for controller 0 has the LU ownership at the time of issuance of an input/output request to the disk 181 becomes no longer necessary and, therefore, the total usage rate of both the cores reduces. On the other hand, the usage rate of the controller bus remains to be "0" because the LU ownership is transferred not between the different controllers and it is thereby unnecessary to transfer data.

As for a change after transferring the LU ownership in LU0 to the core 0 for controller 1, the usage rate of the core 0 for controller 0 is −7% and the usage rate of the core 0 for controller 1 is +10%. The resource usage rate of the core 0 for controller 0 does not become 0% because of the same reason as in the aforementioned case of transfer of the LU ownership to the core 1 for controller 0. Also, this transfer processing is processing for transferring the LU ownership between the different controllers and the resource usage rate of the inter-controller bus is also predicted to increase by +5%.

This is because the configuration in which the core having the LU ownership uses the disk input/output control unit for the local controller and the cache memory for the local controller is assumed in this embodiment. Therefore, it is necessary to use the inter-controller bus 182 in order to exchange data using the host input/output control unit 119 for the controller 111 that actually received the input/output request from the host computer 103, which results in an increase of this resource usage rate.

It is also possible to not use the aforementioned configuration, and select a configuration in which the inter-controller bus 182 is not used by using only the resources of the external controller. Specifically speaking, this is the configuration in which the core 0 for controller 1 controls the disk input/output control unit 118 for the controller 111 and exchanges data using the cache memory 117. In this case, no change is predicted in the usage of the inter-controller bus 182.

As described above, changes in the processor usage rates and the usage rate of the inter-controller bus 182 after the LU ownership change are predicted. Changes after the LU ownership change are also predicted with regard to other resources in the same manner.

Next, overhead to be generated by the transfer processing itself when executing the LU ownership change processing for the LU ownership change pattern selected in S1421 is predicted (S1423).

There are two types of LU ownership change processing: management information transfer and data transfer. The management information transfer is processing for transferring information, which is used to execute processing relating to a certain management unit (LU0 in the example used in S1422), from a certain CPU core (the core 0 for controller 0 in the above-mentioned example) to be placed under the control of an LU ownership change destination candidate (the core 1 for controller 0 or the core 0 for controller 1 in the above-mentioned example). Whether or not data copying is conducted from the memory 116 to the memory 116 or the memory 156 during the above transfer processing depends on the implementation.

The same can be said for the case where the management information is in the cache memory. "Data" in the data transfer means data which exists in the cache memory and is exchanged with the host computer 103 or 104. This data is read from the disk 181 or needs to be written. Regarding the read data, it can be recovered by reading it from the disk 181 again whenever necessary, so that it is possible to discard this data, that is, to discard management information of that data when transferring the management information as described above. Also regarding this data transfer, whether or not data copying is conducted from the cache memory 117 to the cache memory 157 depends on the implementation as in the case of the management information.

In the LU ownership change processing overhead prediction information table T801, the usage rate of the inter-controller bus is predicted to increase based on the premise that the inter-controller bus 182 is used for data transfer.

Incidentally, unlike the resource usage management information 501 or the post-LU-ownership-change resource usage change prediction information 502, the LU ownership change processing overhead prediction information 503 shows the overhead to be generated when executing certain processing (LU ownership change processing) and, therefore, uses a different unit for numeric values. For example, the numeric values are indicated as the usage rates of the respective resources, assuming that the LU ownership change processing is executed in one second. When the numeric values are expressed in this manner, and if the usage rate exceeds 100%, it is possible to determine that the transfer in one second is impossible.

After completion of S1423, the processing returns to the processing for judging whether or not the analysis of all the LU ownership change patters is completed (S1412).

If it is determined in S1412 that the processing for analyzing all the LU ownership change patterns extracted in S1411 (S1421, S1422, S1423) is completed, the post-LU-ownership-change resource usage change prediction information 502 and the LU ownership change processing overhead prediction information 503 are output (S1431).

Figure 10:
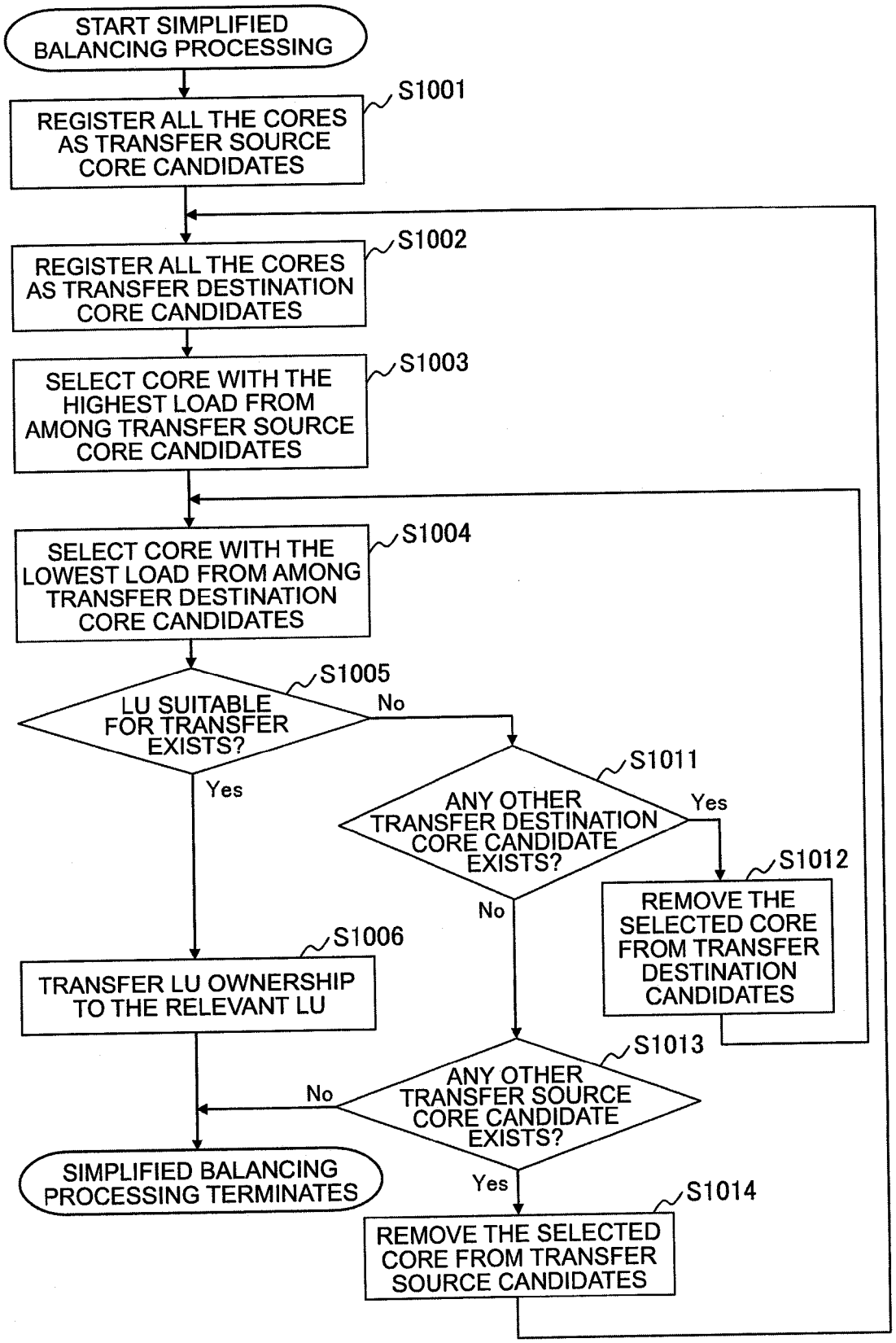
FIG. 10 is a flowchart illustrating simplified balancing processing executed by the storage system according to the embodiment of the present invention.

Next, the simplified balancing processing (S904) will be explained with reference to the flowchart in FIG. 10. The following processing is executed by the core 122 or 162 according to the relevant programs. First, all the cores in the storage system 101 are registered as transfer source core candidates (S1001). Next, all the cores in the storage system 101 are registered as transfer destination core candidates (S1002). Subsequently, the core with the highest load is selected as the transfer source core from among the transfer source candidates (S1003). Then, the core with the lowest load is selected as the transfer destination core from among the transfer destination candidates (S1004).

In order to transfer one or more LUs from the selected transfer source core to the selected transfer destination core, whether any suitable LU in terms of load balance exists or not is judged (S1005). As an example of the case where there is no suitable LU, there may be a case where the core with high load is in charge of only one LU.

In this case, the load on that LU is extremely high and it can be predicted that load imbalance will occur to whichever core the LU ownership is transferred. Therefore, the above-described case is not ideal for the transfer. As another example of the case where there is no suitable LU, there may be a case where only LUs whose transfer is prohibited in the balancing parameter information table T402 or for which quasi prohibition settings are made in the balancing parameter information table T402 exist.

If one or more LUs suitable for transfer exist in S1005, the LU ownership in the relevant LU(s) is transferred from the currently selected transfer source core to the transfer destination core (S1006), thereby completing the simplified balancing processing.

If S1005 returns a negative judgment (there is no LU suitable for transfer), whether any other transfer destination core candidate exists or not is judged (S1011). If another transfer destination core candidate exists, the core currently selected as the transfer destination core is first removed from the transfer destination candidates (S1012) and the processing continues from S1004. If no other transfer destination candidate exists in S1011, whether any other transfer source candidate core exists or not is then judged (S1013).

If S1013 returns an affirmative judgment (another transfer source candidate core exists), the core currently selected as the transfer source core is removed from the transfer source candidates (S1014), and then the processing returns to S1002. If S1013 returns a negative judgment (no transfer source candidate exists other than the currently selected core), this means that LUs suitable for transfer do not exist with regard to all the combinations of the transfer source cores and the transfer destination cores and, therefore, the simplified balancing processing terminates.

Incidentally, there is a more simplified judgment method of, instead of the processing from S1001 to S1004, selecting a core with the maximum load as the transfer source core and a core with the minimum load as the transfer destination core and starting the processing in the state where there is no other candidate. Since the core with the maximum load and the core with the minimum load are always selected as candidates for the LU ownership change, it is possible to judge the necessity of executing the load balancing easily and under low load.

Figure 11:
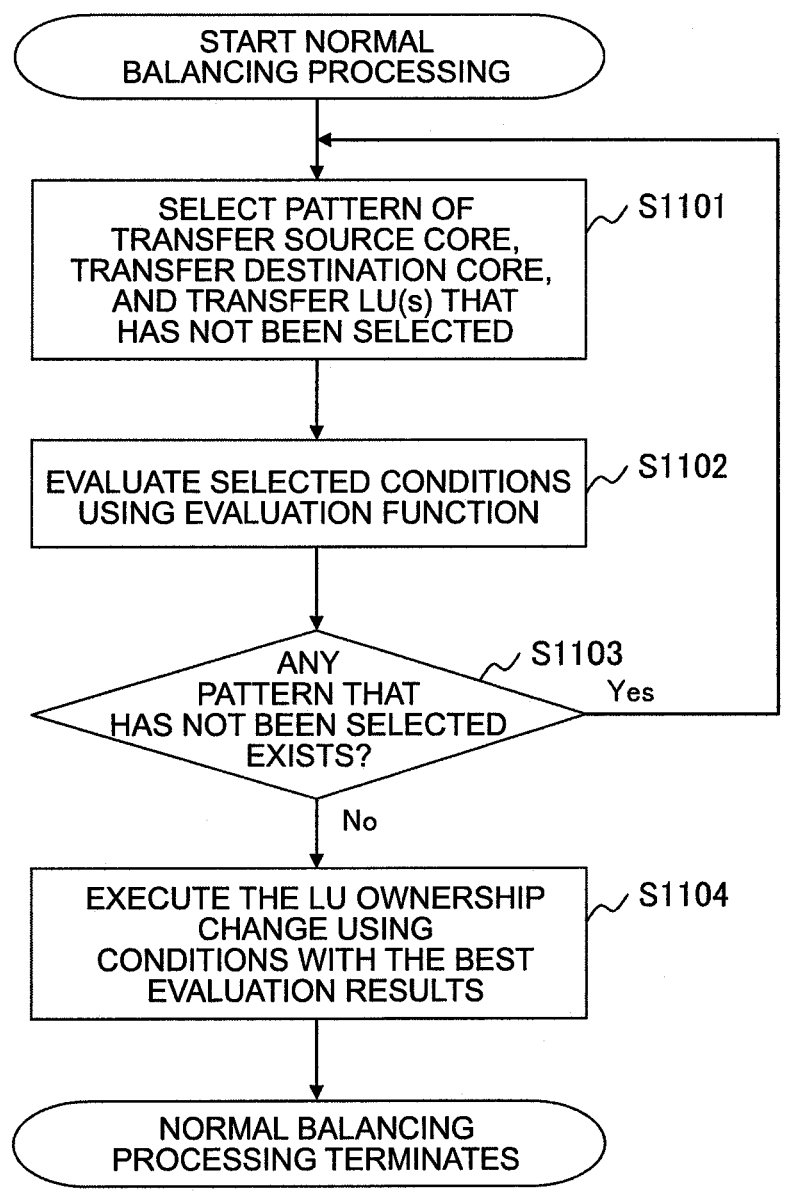
FIG. 11 is a flowchart illustrating normal balancing processing executed by the storage system according to the embodiment of the present invention.

Next, the normal balancing processing will be explained with reference to the flowchart in FIG. 11. The following processing is executed by the core 122 or 162 according to the relevant programs. First, the transfer source core, the transfer destination core, and the transfer object(s) LU(s) are respectively selected from the patterns which have not been selected (S1101). Next, the selected conditions are evaluated using the evaluation function (S1102).

This evaluation function is the function set in S901 and which entry should be prioritized is reflected in the evaluation function according to the settings made by the user. Subsequently, whether or not any pattern that has not been selected exists is judged (S1103). If there is any pattern that has not been selected, the processing returns to S1101.

In other words, S1102 is executed for all the patterns. If there is no more pattern that has not been selected in S1103, the LU ownership change processing is executed based on the pattern with the best evaluation result from among the obtained evaluation results (S1104).

By the method described above, the optimum transfer processing can be realized in accordance with the user's settings and aim including the resource usage which changes after the transfer, load changes caused by the LU ownership change between the different controllers, and the overhead to be generated by the transfer processing itself.

Next, a management screen to which the user's instruction on the load balance is input will be explained with reference to FIG. 12. A management screen 1201 is a screen displayed on the management host 105 to set with what priorities the respective items should be evaluated when balancing the load, and the management screen 1201 is constituted from an automatic transfer setting section 1202, an LU-based automatic transfer setting section 1203, an "OK" button 1204, and a "Cancel" button 1205.

The automatic transfer setting section 1202 has an automatic transfer setting parameter table T1212. The automatic transfer setting parameter table T1212 is used to set whether the automatic transfer processing itself is possible or not, the performance balance, and the respective priorities for the performance of the entire storage system. Furthermore, the setting to specify to what degree the transfer overhead should be prioritized when transferring the LU ownership, and information about to what degree reference should be made to the past performance history as the reference range of performance information to be used when judging the transfer of the LU ownership.

The LU-based automatic transfer setting 1203 has an LU-based automatic transfer setting table T1203. The LU-based automatic transfer setting table T1203 is constituted from, for each LU which is the unit for managing the LU ownership in this embodiment: information about which controller and core are currently in charge of the relevant LU; settings made by the user to specify to which core the relevant LU should be assigned; and settings to specify whether the relevant LU should be the object of the automatic transfer, and to what degree of priority should be set if the relevant LU is the object of the automatic transfer.

The "OK" button 1204 and the "Cancel" button 1205 are buttons for determining whether the settings in the management screen 1201 are to be validated or discarded.

Figure 17:
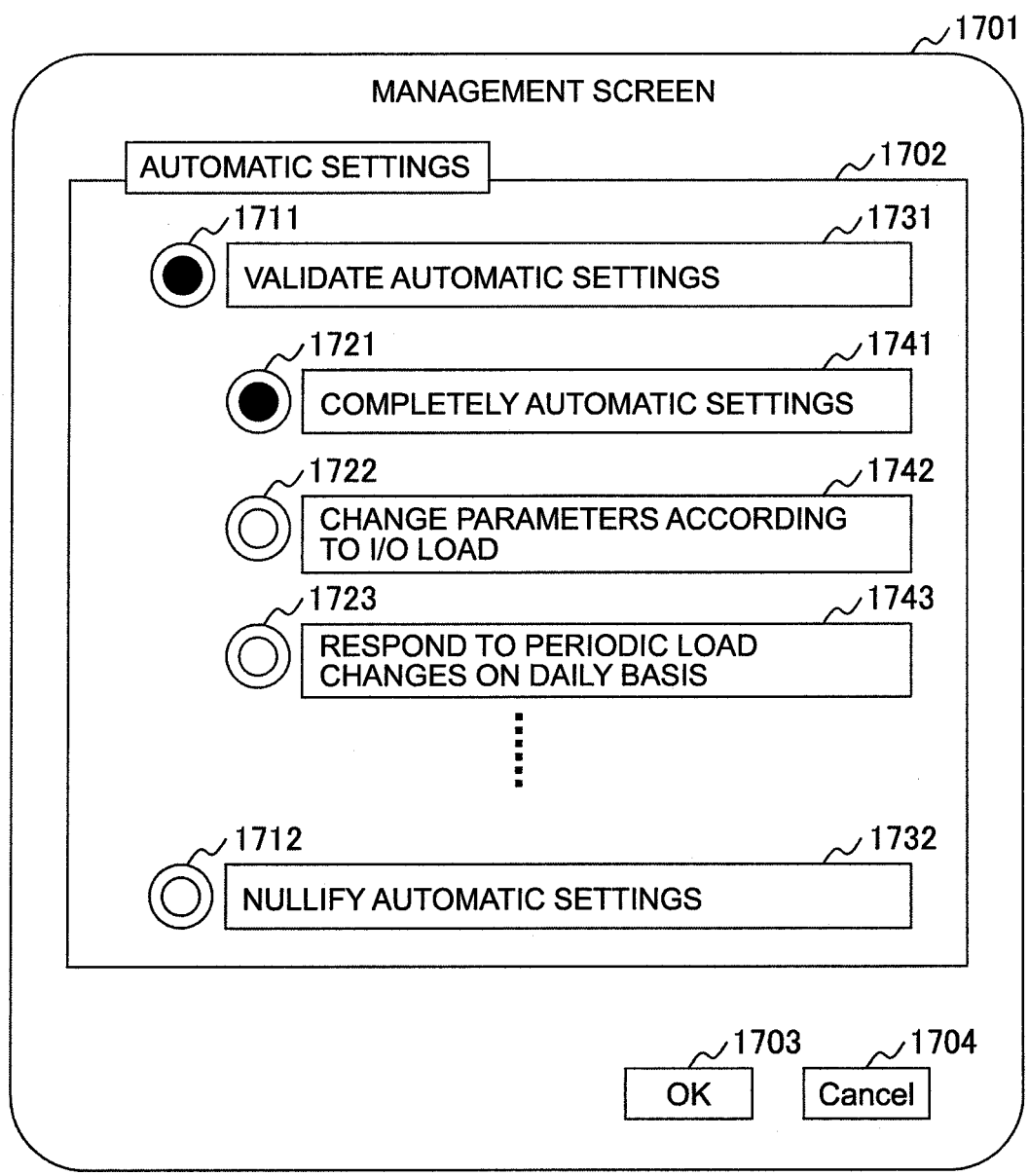
FIG. 17 is a configuration diagram of an automatic setting management screen for the user of the storage system according to the embodiment of the present invention.

Next, another method of inputting the user's instruction on the load balance will be explained with reference to FIG. 17 showing a management screen. A management screen 1701 is a screen used to set the priorities for load balancing processing by means of a certain level of automatic setting. The management screen 1701 is constituted from an automatic setting section 1702, an "OK" button 1703, and a "Cancel" button 1704.

In the automatic setting section 1702, there are a radio button 1711 for validating the automatic setting and a radio button 1712 for nullifying the automatic setting, and only either one of these buttons 1711 or 1712 can be set. Letter strings 1731, 1732 explain the meanings of the radio buttons 1711, 1712 respectively. If the radio button 1712 is validated, i.e., if the automatic setting is nullified, the user sets parameters for the load balancing processing as shown in the management screen 1201 with a certain level of freedom and in detail.

On the other hand, if the radio button 1711 is validated, i.e., if the automatic setting is validated, a setting method is further selected from radio buttons 1721, 1722, 1723, and so on. Letter strings 1741, 1742, and 1743 explain the meanings of the radio buttons 1721, 1722, and 1723, respectively.

If the radio button 1721 is validated, i.e., if the completely automatic setting is validated, the balancing parameter information 402 which is constituted from the parameters for the load balancing processing is set completely automatically. When this happens, as in the case where the following radio button 1722 or 1723 is set, parameter settings are automatically selected so that the parameters will be valid for dynamic load changes which are difficult for the use to follow, and for load changes having periodical characteristics.

If the radio button 1722 is set, i.e., if the setting to change parameters according to I/O load is selected, the balancing parameter information 402 is set in consideration of the entire I/O load issued to the storage system 101.

This means that if the I/O load issued to the storage system 101 is high, there is a possibility that the storage system 101 may become a performance bottleneck and, therefore, the balancing parameter information 402 is set so that the total performance will be increased as much as possible as rather than the performance balance. On the other hand, if the I/O load issued to the storage system 101 is low, the balancing parameter information 402 is set so that the performance balance will be prioritized in order to prevent the occurrence of a performance difference between applications using the storage system 101 and prepare for a sudden increase of the I/O load. In other words, the settings are made to dynamically change the balancing parameter information 402 according to the I/O load status of the storage system 101.

If the radio button 1723 is set, i.e., if the setting to respond to periodic load changes on a daily basis is selected, it is assumed that a periodic load will be issued to the storage system 101 on a daily basis, and periodic changes are recorded and utilized. In other words, characteristics of high load processing such as backups and batch processing executed at night are recorded, and the balancing parameter information 402 is then dynamically changed so that it can promptly follow the recorded characteristics.

The "OK" button 1703 and the "Cancel" button 1704 are buttons for determining whether the settings in the management screen 1701 are to be validated or discarded.

Next, a screen used to inform the user of internal performance information about the storage system 101 will be explained with reference to FIG. 15. The internal performance information is constituted from resource usage 1511, resource usage change prediction 1521, LU ownership change processing overhead prediction 1531, an "OK" button 1541, and an "Update" button 1542 on the management screen 1501.

The resource usage 1511 displays the present resource usage and the past resource usage in the form of a resource usage table T1512. The information displayed in this table is the same as that shown in the resource usage management information table T601. Needless to say, other representation methods such as graphic representation are also possible so that the user can easily and visually comprehend the status.

The resource usage change prediction 1521 is constituted from a resource usage change prediction table T1522. The information displayed in this table is the same as that shown in the post-LU-ownership-change resource usage change prediction information table T701. As in the case of T1512, this table can employ the same representation as that of the resource usage 1511 in order to indicate the usage after the LU ownership change so that the user can easily comprehend the status. Furthermore, the form in which the past resource usage change prediction history is additionally displayed is also possible.

The LU ownership change processing overhead prediction 1531 is constituted from an LU ownership change processing overhead prediction table T1532. The information displayed in this table is the same as that shown in the LU ownership change processing overhead prediction information table T801. As in the case of T1512, the representation of this table can be changed to indicate, for example, time for the transfer processing using all the resources so that the user can easily comprehend the status.

The "OK" button 1541 is a button for terminating the display processing. The "Update" button 1542 is a button for updating the displayed information.

Next, a screen used to inform the user of the LU ownership change processing history will be explained with reference to FIG. 16. The LU ownership change processing history information is constituted from an LU ownership change processing execution history 1611, an "OK" button 1621, and an "Update" button 1622 on the management screen 1601.

The LU ownership change processing execution history 1611 is constituted from an LU ownership change processing execution history table T1612. The LU ownership change processing execution history table T1612 is constituted from time of execution of the LU ownership change processing in the past, an object LU, pre-transfer CPU core, and a post-transfer CPU core. The LU ownership change processing execution history table T1612 can inform the user of how the LU ownership change processing has been executed, and the user can check if the transfer has been conducted exactly how it was originally intended in the settings of FIG. 12.

The "OK" button 1621 is a button for terminating the display processing. The "Update" button 1622 is a button for updating the displayed history information.

When distributing the load on the respective asymmetric cores 122, 162 that receive an LU ownership in LU(s) and take charge of processing the LU(s) according to this embodiment, the core having the LU ownership extracts, for each LU based on the LU ownership management information T401, patterns showing the relationship between the core having the LU ownership and the transfer destination candidate core; measures, for each LU, the usage of a plurality of resources constituting the storage system 101; predicts, for each LU based on the measurement results, changes in the usage of the plurality of resources that might occur after the transfer of the LU ownership; also predicts, for each LU based on the measurement results, overhead to be generated by the LU ownership change processing itself; selects, from among the respective extracted patterns based on the respective prediction results, a pattern that matches the setting information (balancing parameter information 402); and transfers the LU ownership to the core belonging to the selected pattern.

Industrial Applicability

According to this embodiment, it is possible to carry out optimum load distribution to a plurality of asymmetric cores in accordance with settings.

The invention claimed is:
1. A storage system comprising;
a plurality of storage devices, wherein a plurality of logical units (LU) is configured in physical storage areas of the storage devices; and a plurality of controllers connected to each other via a bus, in which each of the controllers includes a plurality of processing cores in charge of input/output processing of input/output to/from the plurality of logical units (LU);

wherein each processing core is configured to be in charge of input/output processing of input/output to/from a respective logical unit, to set the respective logical unit as an access object for a host computer and to control sending/receiving of data to/from one or more storage devices in association with read/write from/to the respective logical unit; and wherein each of the controllers is configured to:

(a) extract, for each of the logical units, a plurality of possible LU ownership change patterns based on LU ownership management information, which defines correspondence relationships between the logical units and the processing cores having LU ownerships for the logical units, respectively, in that the correspondence relationships indicate which processing core is currently in charge of processing with regard to each logical unit, wherein each possible LU ownership change pattern indicates a combination of the processing core, which is currently in charge of the respective logical unit, as an LU ownership transfer source and another processing core as an LU ownership transfer destination candidate to which an LU ownership for the respective logical unit can be transferred by means of an LU ownership transfer;

(b) measure, for each of the logical units, the usage of resources in the data processing for the logical unit, wherein the resources include the plurality of processing cores and other resources constituting the controllers;

(c) predict, for each of the logical units and each possible LU ownership change pattern for the respective logical unit, a change in the usage of the resources, including the respective LU ownership transfer destination candidate core of the respective possible LU ownership change pattern, after LU ownership transfer from the respective LU ownership transfer source core to the respective LU ownership transfer destination candidate core based on the measurement results in (b);

(d) predict, for each of the logical units and each possible LU ownership change pattern for the respective logical unit, a respective overhead corresponding to a load to be generated when executing transfer processing in the LU ownership transfer from the respective LU ownership transfer source core to the respective LU ownership transfer destination candidate core; and (e) select one of the plurality of extracted LU ownership change patterns which matches setting information including one or more policies a user sets for load balance based on the respective prediction results of the predictions in (c) and (d); and (f) execute the LU ownership transfer from the respective LU ownership transfer source core to the respective LU ownership transfer destination candidate core belonging to the selected LU ownership change pattern; and (g) register the selected LU ownership change pattern in the LU ownership management information;

wherein the controllers are configured to execute the LU ownership transfer in (f) between cores existing in different controllers as well as between cores existing in the same controller; and wherein the LU ownership change pattern corresponding to the LU ownership transfer between the controllers is included in the possible LU ownership change patterns for which the prediction of change in the usage of the resources is performed.

2. The storage system according to claim 1, wherein each of the controllers includes a memory for storing programs, the plurality of cores for processing data in accordance with the programs stored in the memory, and a cache memory for temporarily storing data in association with processing of each core;

wherein each core receives LU ownership for the plurality of logical units and takes charge of processing with regard to the logical units.

3. The storage system according to claim 1, wherein each of the cores operates according to Asymmetric Multi Processing (AMP) method.

4. The storage system according to claim 1, wherein the LU ownership management information includes information indicating the correspondence relationship between the cores being in charge of the logical units and the controllers to which the respective cores belong.

5. The storage system according to claim 1, wherein the usage of the plurality of resources is information including usage rates of the plurality of resources and a usage rate of the bus connecting the plurality of controllers.

6. The storage system according to claim 1, wherein the setting information includes a load balance priority, a system performance priority, and an acceptable overhead level as parameters for distributing the load on the respective cores.

7. The storage system according to claim 1, wherein the setting information includes a load balance priority and a system performance priority as parameters for distributing the load on the respective cores, wherein if the load balance priority is higher than the system performance priority, the controller selects in (e), as the LU ownership change pattern that matches the setting information, an LU ownership change pattern for distributing the load on the respective resources; or if the load balance priority is lower than the system performance priority, the controller selects in (e), as the LU ownership change pattern that matches the setting information, an LU ownership change pattern for enhancing the system performance even if that selected pattern may make the load on the respective resources imbalanced.

8. The storage system according to claim 1, wherein setting information includes an acceptable overhead level as a parameter for distributing the load on the respective cores, and wherein the controller selects in (e), as the LU ownership change pattern that matches the setting information, an LU ownership change pattern that makes the change in the usage lower than the acceptable transfer overhead level.

9. A data controlling method for a storage system, the storage system comprising:

a plurality of storage devices, wherein a plurality of logical units (LU) is configured in physical storage areas of the storage devices; and a plurality of controllers connected to each other via a bus, in which each of the controllers includes a plurality of processing cores being in charge of input/output processing input/output to/from the plurality of logical units (LU);

wherein each processing core is configured to be in charge of input/output processing of input/output to/from a respective logical unit, to set the respective logical unit as an access object for a host computer and to control sending/receiving of data to/from one or more storage devices in association with read/write from/to the respective logical unit; and wherein the method comprises:

(a) extracting, for each of the logical units, a plurality of possible LU ownership change patterns based on LU ownership management information, which defines correspondence relationships between the logical units and the processing cores having LU ownerships for the logical units, respectively, in that the correspondence relationships indicate which processing core is currently in charge of processing with regard to each logical unit, wherein each possible LU ownership change pattern indicates a combination of the processing core, which is currently in charge of the respective logical unit, as an LU ownership transfer source and another processing core as an LU ownership transfer destination candidate to which an LU ownership for the respective logical unit can be transferred by means of an LU ownership transfer;

(b) measuring, for each of the logical units, the usage of resources in the data processing for the logical unit, wherein the resources include the plurality of processing cores and other resources constituting the controllers;

(c) predicting, for each of the logical units and each possible LU ownership change pattern for the respective logical unit, a change in the usage of the resources, including the respective LU ownership transfer destination candidate core of the respective possible LU ownership change pattern, after LU ownership transfer from the respective LU ownership transfer source core to the respective LU ownership transfer destination candidate core based on the measurement results in (b);

(d) predicting, for each of the logical units and each possible LU ownership change pattern for the respective logical unit, a respective overhead corresponding to a load to be generated when executing transfer processing in the LU ownership transfer from the respective LU ownership transfer source core to the respective LU ownership transfer destination candidate core; and (e) selecting one of the plurality of extracted LU ownership change patterns which matches setting information including one or more policies a user sets for load balance based on the respective prediction results of the predictions in (c) and (d); and (f) executing the LU ownership transfer from the respective LU ownership transfer source core to the respective LU ownership transfer destination candidate core belonging to the selected LU ownership change pattern; and (g) registering the selected LU ownership change pattern in the LU ownership management information;

wherein the controllers are configured to execute the LU ownership transfer in (f) between cores existing in different controllers as well as between cores existing in the same controller; and wherein the LU ownership change pattern corresponding to the LU ownership transfer between the controllers is included in the possible LU ownership change patterns for which the prediction of a change in the usage of the resources is performed.

\* \* \* \* \*